US007330196B2

(12) United States Patent
Ishihara

(10) Patent No.: US 7,330,196 B2
(45) Date of Patent: Feb. 12, 2008

(54) APPARATUS AND METHOD FOR IMAGE PROCESSING CAPABLE OF ACCELERATING IMAGE OVERLAY PROCESS

(75) Inventor: Hiroshi Ishihara, Tokyo (JP)

(73) Assignee: Ricoh Company Ltd., Tokyo (JP)

( * ) Notice: Subject to any disclaimer, the term of this patent is extended or adjusted under 35 U.S.C. 154(b) by 0 days.

(21) Appl. No.: 10/625,111

(22) Filed: Jul. 22, 2003

(65) Prior Publication Data
US 2004/0135796 A1 Jul. 15, 2004

(30) Foreign Application Priority Data
Jul. 23, 2002 (JP) ............... 2002-214014

(51) Int. Cl.
G09G 5/00 (2006.01)
(52) U.S. Cl. ..................... 345/631; 345/635
(58) Field of Classification Search ......... 345/629–641
See application file for complete search history.

(56) References Cited

U.S. PATENT DOCUMENTS

| 4,482,810 | A | * | 11/1984 | Cooke ............... 250/492.2 |
| 4,825,250 | A | * | 4/1989 | Miyata et al. ............ 399/82 |
| 4,894,646 | A | * | 1/1990 | Ryman ................. 345/556 |
| 5,572,634 | A | * | 11/1996 | Duluk, Jr. ............. 345/419 |
| 5,870,100 | A | * | 2/1999 | DeFreitas ............. 345/441 |
| 5,926,188 | A | * | 7/1999 | Kawamoto et al. ...... 345/629 |
| 5,982,951 | A | * | 11/1999 | Katayama et al. ....... 382/284 |
| 5,990,904 | A | * | 11/1999 | Griffin ................. 345/631 |
| 6,111,994 | A | * | 8/2000 | Katayama et al. ....... 382/298 |
| 6,148,118 | A | * | 11/2000 | Murakami et al. ....... 382/284 |
| 6,219,454 | B1 | * | 4/2001 | Kawano et al. ......... 382/232 |
| 6,377,279 | B1 | * | 4/2002 | Miura ................. 345/635 |
| 6,400,908 | B1 | * | 6/2002 | Parulski ............... 396/311 |
| 6,466,231 | B1 | * | 10/2002 | Dow et al. ............ 345/629 |
| 6,597,363 | B1 | * | 7/2003 | Duluk et al. ........... 345/506 |
| 6,646,655 | B1 | * | 11/2003 | Brandt et al. .......... 715/723 |
| 6,704,456 | B1 | * | 3/2004 | Venable ............... 382/266 |
| 6,867,801 | B1 | * | 3/2005 | Akasawa et al. ....... 348/222.1 |
| 2002/0060675 | A1 | * | 5/2002 | Hashimoto ............. 345/204 |

(Continued)

FOREIGN PATENT DOCUMENTS

EP 0924653 A2 6/1999

(Continued)

OTHER PUBLICATIONS

McIntosh, John M. "POSTSCRIPT: A Page Description Language." Web Publication—Oct. 6, 1999. □□http://www.smalltalkconsulting/papers/otherOlderPapers/postscriptArticle.html.*

(Continued)

Primary Examiner—Ryan Yang
(74) Attorney, Agent, or Firm—Cooper & Dunham LLP

(57) ABSTRACT

An image processing apparatus includes an overlay detector and a memory. The image processing apparatus and method sequentially process graphic rendering instructions for image data. The graphic rendering instructions include first and second graphic rendering instructions. The first graphic rendering instruction is input immediately preceding said second graphic rendering instruction. The first graphic rendering instruction contains first rendering data representing a first original image to render a first output image. The second graphic rendering instruction contains second rendering data representing a second original image to render a second output image. The first original image is overlaid by the second original image.

31 Claims, 7 Drawing Sheets

U.S. PATENT DOCUMENTS

| | | | |
|---|---|---|---|
| 2002/0140827 A1* | 10/2002 | Okisu et al. | 348/222.1 |
| 2002/0154128 A1* | 10/2002 | Zachmann | 345/474 |
| 2002/0178183 A1* | 11/2002 | Meding | 707/509 |
| 2003/0085908 A1* | 5/2003 | Luby | 345/619 |
| 2003/0152272 A1* | 8/2003 | Venable | 382/199 |

FOREIGN PATENT DOCUMENTS

| | | | |
|---|---|---|---|
| EP | 1160728 A2 | | 12/2001 |
| JP | 8-55219 | | 2/1996 |
| JP | 10233859 | | 9/1998 |
| JP | 10-333852 | | 12/1998 |
| JP | 10333852 | | 12/1998 |
| JP | 10333852 A | * | 12/1998 |
| JP | 11-119930 | | 4/1999 |
| JP | 11119930 | | 4/1999 |
| JP | 2001-88367 | | 4/2001 |
| JP | 2001-331303 | | 11/2001 |

OTHER PUBLICATIONS

R. Fisher, S. Perkins, A. Walker, E. Wolfart. "Point Operations: Logical OR/NOR". 2003. ☐☐.*

Sep. 30, 2005 Chinese-language Office Action.

Nov. 28, 2003 official Communication and European Search Report.

XP 000572087 "The Language of Imaging: POSTSCRIPT", (1988) pp. 544-548.

U.S. Appl. No. 10/300,586, filed Nov. 21, 2002.

* cited by examiner

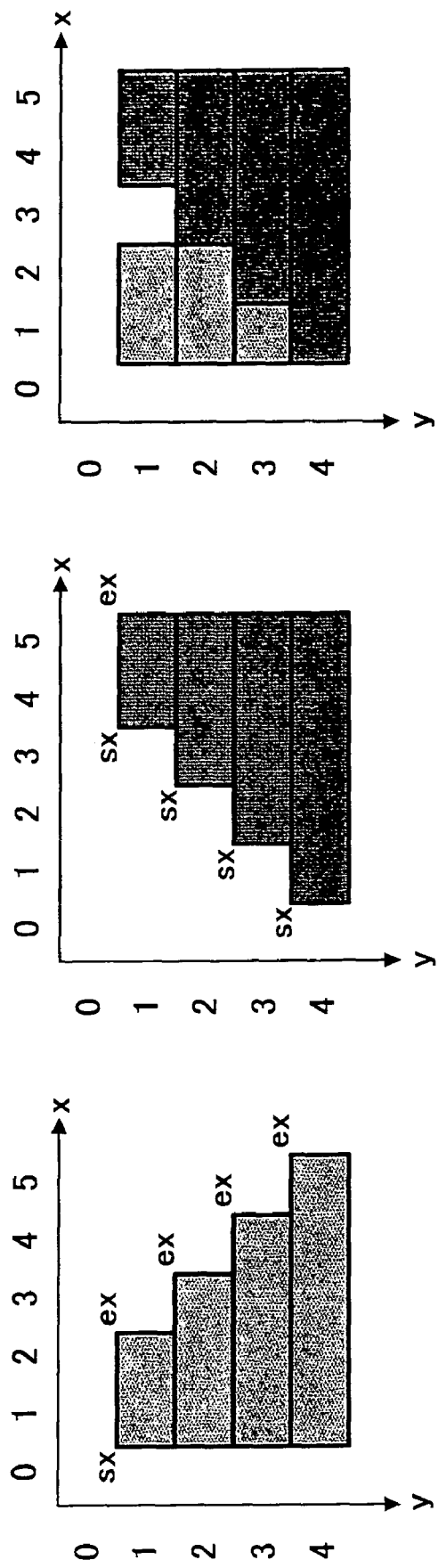

APPARATUS AND METHOD FOR IMAGE PROCESSING CAPABLE OF ACCELERATING IMAGE OVERLAY PROCESS

BACKGROUND

1. Field

The present patent specification relates to an apparatus and method for image processing, and more particularly to an apparatus and method for image processing which is capable of accelerating an image overlay process by detecting and omitting an image overlaid.

2. Discussion

Japanese Laid-Open Patent Application Publication No. 10-233859 explains a conventional technology in which superimposed image data are output on a recording sheet. In the above-mentioned technology, overlaid image data are detected by a printer driver for determining specific image data that are overlaid and data transfer to a printing medium may decrease by omitting a part of image data which are overlaid. Thereby, data processing in printing is also expected to decrease by means of replacing overlaid part of image data to produce identical color image data. In another example of conventional technology, Japanese Laid-Open Patent Application Publication No. 10-333852 describes a technology in which coordinates of the circumscribed rectangles of characters and figures, not limited to graphic image data, are obtained, abstraction of the obtained coordinates of the circumscribed rectangle is performed and an overlay of image data is detected with reference to the coordinates of the rectangle. In Japanese Laid-Open Patent Application Publication No. 11-119930, the time when rendering of image data is finished is anticipated and when it is determined that the rendering of image data may not be further developed at a predetermined interval thereafter, overlaid image data portion is detected between overlaid intermediate data whose rendering range of characters or graphics is divided in every trapezoid. The above-described conventional overlay detection technologies in which image data which are overlaid are detected on the side of a printer driver have a defect in that the above-described technologies are specific and limited to image data and in that as a result information processing for omitting overlaid portion of image data increases.

SUMMARY

In view of the foregoing, it is an object to provide an image processing apparatus which is capable of accelerating an image overlay process by detecting and omitting an overlaid image.

Another object is to provide a novel image processing method which is capable of accelerating an image overlay process by detecting and omitting an overlaid image.

Another object is to provide a novel image forming apparatus which is capable of accelerating an image overlay process by detecting and omitting an overlaid image.

Another object is to provide a novel printing apparatus which is capable of accelerating an image overlay process by detecting and omitting an overlaid image.

Another object is to provide a novel host PC which is capable of accelerating an image overlay process by detecting and omitting an overlaid image.

To achieve the above-mentioned objects and other objects, a novel image processing apparatus includes an overlay detector and a memory. The novel image processing apparatus sequentially processes graphic rendering instructions for image data. The graphic rendering instructions include first and second graphic rendering instructions. The first graphic rendering instruction is input immediately preceding the second graphic rendering instruction. The first graphic rendering instruction contains first rendering data representing a first original image to render a first output image. The second graphic rendering instruction contains second rendering data representing a second original image to render a second output image. The first original image is overlaid by the second original image. The overlay detector performs an overlay detection to detect an overlay of the first and second images which are rendered based on the first and second rendering data by the first and second rendering instructions, respectively. The memory stores the first rendering data contained in the first graphic rendering instruction. The overlay detector specifies a portion of the first original image overlaid by the second original image upon detecting an overlay of the first and second original images, deletes the specified portion of the first original image which is overlaid by the second original image and draws a third output image, based on the first original image and stores the second graphic rendering data into the memory.

The graphic rendering instructions may be a page description language (PDL) and each of the graphic rendering instructions may include a fundamental graphic description instruction which handles characters, graphics and images and a rendering attribute instruction handling colors, clipping area designations and rendering arithmetic methods.

The graphic rendering instructions may be converted into at least one of intermediate data represented by coordinate information and a PDL language.

Each of the first and second original images may include at least one of rectangle figure and run aggregate figure.

The overlay detector may perform the overlay detection by each run when the overlay detection mechanism detects an overlay of the run aggregate figures.

When the overlay detector detects an overlay of the run aggregate figures, the overlay detecting mechanism may generate a circumscribing rectangle for the run aggregate figure of the first and second original images and, after the overlay detecting mechanism detects an overlay between the circumscribing rectangle for the run aggregate figure for the first and second original images, may determine the run aggregate figure included in the run aggregate figure of an overlaid portion between the first and second original images of the circumscribed rectangle.

The overlay detector may determine whether the run aggregate figure included in the run aggregate figure of an overlaid portion between the first and second original images of the circumscribed rectangle and the overlay detection is performed by each run.

The second output image may be overwritten on the third output image.

The first and second output image may be drawn with a rendering process based on at least one of a mono chrome, an RGB video color rendering, and a CMYK paint color rendering.

To achieve these and other objects, a novel image processing method includes an overlay detector and a memory. This novel image processing method sequentially processes graphic rendering instructions for image data. The graphic rendering instructions include first and second graphic rendering instructions. The first graphic rendering instruction is input immediately preceding said second graphic rendering instruction. The first graphic rendering instruction containing first rendering data representing a first original image to render a first output image. The second graphic rendering instruction contains second rendering data representing a second original image to render a second output image. The first original image is overlaid by the second original image. The overlay detector performs an overlay detection to detect an overlay of the first and second images which are rendered based on the first and second rendering data by the first and second rendering instructions, respectively and the memory stores the first rendering data contained in the first graphic rendering instruction. The overlay detecting methods specifies a portion of the first original image to be overlaid by the second original image upon detecting an overlay of the first and second original images, deletes a specified portion and draws a third output image, based on the first original image, in which the specified portion of the first original image is deleted and stores the second graphic rendering data into the memory.

The graphic rendering instructions may be a page description language and each of the graphic rendering instructions may include a fundamental graphic description instruction which handles characters, graphics and images and a rendering attribute instruction handling colors, clipping area designations and rendering arithmetic methods.

The graphic rendering instructions may be converted into at least one of intermediate data represented by coordinate information and a PDL language.

Each of the first and second original images may include at least one of rectangle figure and run aggregate figure.

The overlay detector may perform the overlay detection by each run when the overlay detection mechanism detects an overlay of the run aggregate figures.

When the overlay detector detects an overlay of the run aggregate figures, the overlay detecting mechanism may generate a circumscribing rectangle for the run aggregate figure of the first and second original images and, after the overlay detecting mechanism detects an overlay between the circumscribing rectangle for the run aggregate figure for the first and second original images, may determine the run aggregate figure included in the run aggregate figure of an overlaid portion between the first and second original images of the circumscribed rectangle.

The overlay detector may determine whether the run aggregate figure included in the run aggregate figure of an overlaid portion between the first and second original images of the circumscribed rectangle and the overlay detection is performed by each run.

The second output image may be overwritten on the third output image.

The first and second output image may be drawn with a rendering process based on at least one of a mono chrome, an RGB video color rendering, and a CMYK paint color rendering.

To achieve these and other objects, a novel printing apparatus includes an overlay detector and a memory. This novel printing apparatus sequentially processes graphic rendering instructions for image data. The graphic rendering instructions include first and second graphic rendering instructions. The first graphic rendering instruction is input immediately preceding to the second graphic rendering instruction. The first graphic rendering instruction contains first rendering data representing a first original image to render a first output image. The second graphic rendering instruction contains second rendering data representing a second original image to render a second output image. The original first image is overlaid by the second original image. The overlay detector performs an overlay detection to detect an overlay of the first and second original images which are rendered based on the first and second rendering data by the first and second rendering instructions, respectively. The memory stores the first rendering data contained in the first graphic rendering instruction. The overlay detecting mechanism specifies a portion of the first original image to be overlaid by the second original image upon detecting an overlay of the first and second original images, deletes a specified portion and draws a third output image, based on the first original image, in which the specified portion of the first original image is deleted and stores the second graphic rendering data into the memory.

The graphic rendering instructions may be a page description language and each of the graphic rendering instructions may include a fundamental graphic description instruction which handles characters, graphics and images and a rendering attribute instruction handling colors, clipping area designations and rendering arithmetic methods.

The graphic rendering instructions may be converted into at least one of intermediate data represented by coordinate information and a PDL language.

Each of the first and second original images may include at least one of rectangle figure and run aggregate figure.

The overlay detector may perform the overlay detection by each run when the overlay detection mechanism detects an overlay of the run aggregate figures.

When the overlay detector detects an overlay of the run aggregate figures, the overlay detecting mechanism may generate a circumscribing rectangle for the run aggregate figure of the first and second original images and, after the overlay detecting mechanism detects an overlay between the circumscribing rectangle for the run aggregate figure for the first and second original images, may determine the run aggregate figure included in the run aggregate figure of an overlaid portion between the first and second original images of the circumscribed rectangle.

The overlay detector may determine whether the run aggregate figure included in the run aggregate figure of an overlaid portion between the first and second original images of the circumscribed rectangle and the overlay detection is performed by each run.

The second output image may be overwritten on the third output image.

The first and second output image may be drawn with a rendering process based on at least one of a mono chrome, an RGB video color rendering, and a CMYK paint color rendering.

To achieve the above-mentioned objects and other objects, a novel host PC includes an overlay detector and a memory. This novel host PC sequentially processes graphic rendering instructions for image data. The graphic rendering instructions include first and second graphic rendering instructions. The first graphic rendering instruction is input immediately preceding to said second graphic rendering instruction. The first graphic rendering instruction contains first rendering data representing a first original image to render a first output image. The second graphic rendering instruction contains second rendering data representing a second original image to render a second output image. The first original image is overlaid by said second original image. The overlay detecting mechanism performs an overlay detection to detect an overlay of the first and second original images which are rendered based on the first and second rendering data by the first and second rendering instructions, respectively. The memory stores the first rendering data contained in the first graphic rendering instruction. The overlay detecting mechanism specifies a portion of the first original image to be overlaid by the second original image upon detecting an overlay of the first and second original images, deletes a specified portion and draws a third output image, based on the first original image, in which the specified portion of the first original image is deleted and stores the second graphic rendering data into the memory.

The graphic rendering instructions may be a page description language and each of the graphic rendering instructions may include a fundamental graphic description instruction which handles characters, graphics and images and a rendering attribute instruction handling colors, clipping area designations and rendering arithmetic methods.

The graphic rendering instructions may be converted into at least one of intermediate data represented by coordinate information and a PDL language.

Each of the first and second original images may include at least one of rectangle figure and run aggregate figure.

The overlay detector may perform the overlay detection by each run when the overlay detection mechanism detects an overlay of the run aggregate figures.

When the overlay detector detects an overlay of the run aggregate figures, the overlay detecting mechanism may generate a circumscribing rectangle for the run aggregate figure of the first and second original images and, after the overlay detecting mechanism detects an overlay between the circumscribing rectangle for the run aggregate figure for the first and second original images, may determine the run aggregate figure included in the run aggregate figure of an overlaid portion between the first and second original images of the circumscribed rectangle.

The overlay detector may determine whether the run aggregate figure included in the run aggregate figure of an overlaid portion between the first and second original images of the circumscribed rectangle and the overlay detection is performed by each run.

The second output image may be overwritten on the third output image.

The first and second output image may be drawn with a rendering process based on at least one of a mono chrome, an RGB video color rendering, and a CMYK paint color rendering.

To achieve these and other objects, a novel image forming apparatus includes an overlay detector and a memory. This novel image forming apparatus sequentially processes graphic rendering instructions for image data. The graphic rendering instructions include first and second graphic rendering instructions. The first graphic rendering instruction is input immediately preceding to said second graphic rendering instruction. The first graphic rendering instruction contains first rendering data representing a first original image to render a first output image. The second graphic rendering instruction contains second rendering data representing a second original image to render a second output image. The first original image is overlaid by said second original image. The overlay detector performs an overlay detection to detect an overlay of the first and second original images which are rendered based on the first and second rendering data by the first and second rendering instructions, respectively. The memory stores the first rendering data contained in the first graphic rendering instruction. The overlay detecting mechanism specifies a portion of the first original image to be overlaid by the second original image upon detecting an overlay of the first and second original images, deletes a specified portion and draws a third output image, based on the first original image, in which the specified portion of the first original image is deleted and stores the second graphic rendering data into the memory.

The graphic rendering instructions may be a page description language and each of the graphic rendering instructions may include a fundamental graphic description instruction which handles characters, graphics and images and a rendering attribute instruction handling colors, clipping area designations and rendering arithmetic methods.

The graphic rendering instructions may be converted into at least one of intermediate data represented by coordinate information and a PDL language.

Each of the first and second original images may include at least one of rectangle figure and run aggregate figure.

The overlay detector may perform the overlay detection by each run when the overlay detection mechanism detects an overlay of the run aggregate figures.

When the overlay detector detects an overlay of the run aggregate figures, the overlay detecting mechanism may generate a circumscribing rectangle for the run aggregate figure of the first and second original images and, after the overlay detecting mechanism detects an overlay between the circumscribing rectangle for the run aggregate figure for the first and second original images, may determine whether the run aggregate figure included in the run aggregate figure of an overlaid portion between the first and second original images of the circumscribed rectangle.

The overlay detector may determine whether the run aggregate figure included in the run aggregate figure of an overlaid portion between the first and second original images of the circumscribed rectangle and the overlay detection is performed by each run.

The second output image may be overwritten on the third output image.

The first and second output image may be drawn with a rendering process based on at least one of a mono chrome, an RGB video color rendering, and a CMYK paint color rendering.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying renderings, wherein:

FIGS. 6A through 6C collectively show an exemplary illustration of an overlay detection of a run aggregate rendering performed in a graphic overlay determination unit of FIG. 1; and, FIGS. 7A through 7D collectively show another exemplary illustration of an overlay detection of a run aggregate rendering performed in a graphic overlay determination unit of FIG. 1.

DETAILED DESCRIPTION OF PREFERRED EMBODIMENTS

Figure 1:
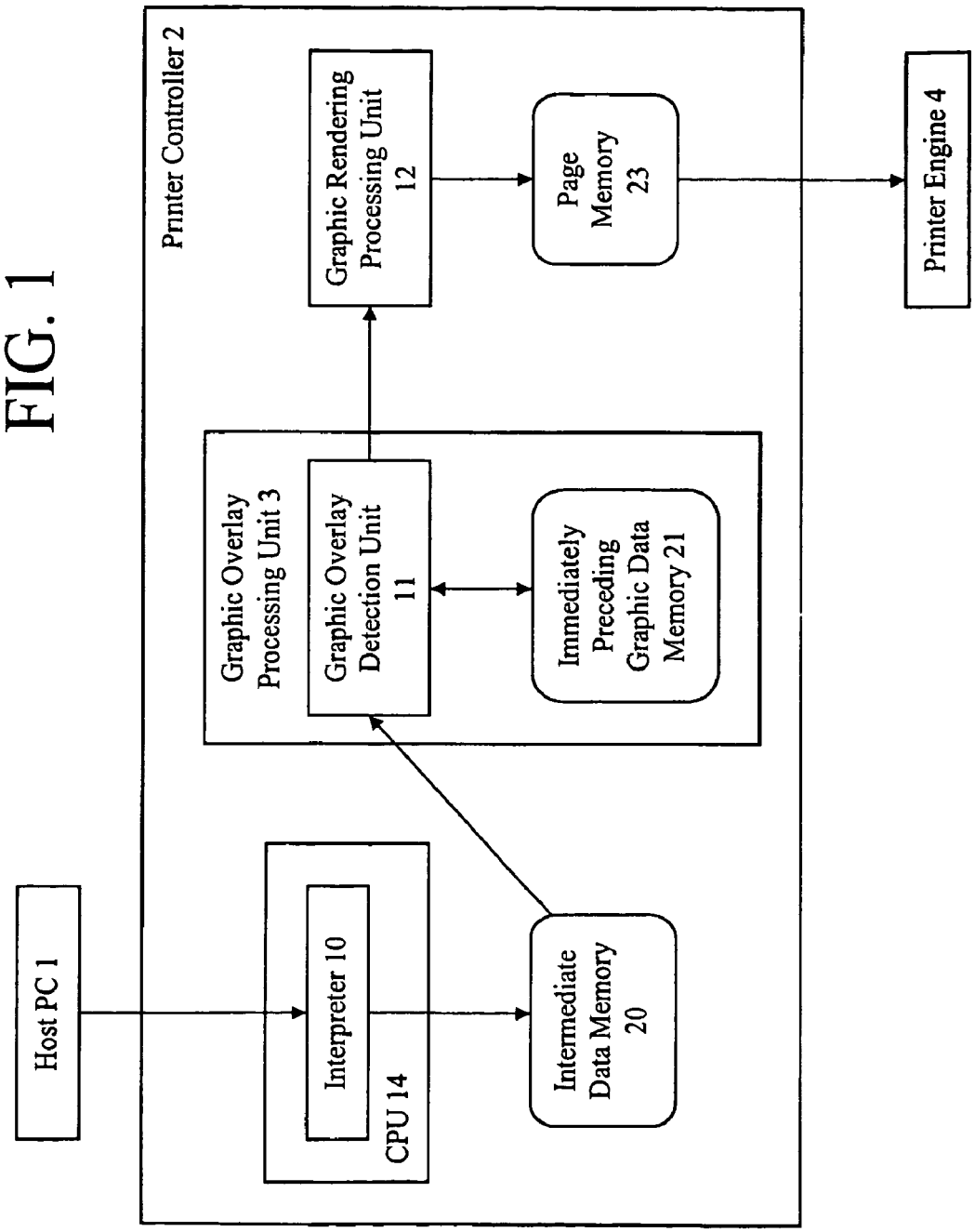
FIG. 1 is a block diagram showing an exemplary structure of a printer controller including an image processing apparatus used when an overlay detection is performed in a printing machine in according to a preferred embodiment.

In describing preferred embodiments illustrated in the renderings, specific terminology is employed for the sake of clarity. However, the disclosure of this patent specification is not intended to be limited to the specific terminology so selected and it is to be understood that each specific element includes all technical equivalents that operate in a similar manner. Referring now to an image processing apparatus, wherein like reference numerals designate identical or corresponding parts throughout the several views, particularly to FIG. 1, a description is made for an overlay detection performed in a printer controller 2 according to a preferred embodiment. As shown in FIG. 1, the printer controller 2 is connected to a host personal computer 1 (hereinafter referred to as PC 1) and a printer engine 4. The printer controller 2 includes a graphic overlay processing unit 3, an interpreter 10, a graphic rendering processing unit 12, a central processing unit (CPU) 14, an intermediate data memory 20 and a page memory 23. The graphic overlay processing unit 3 serves as an image processing apparatus in the embodiment. The graphic overlay processing unit 3 includes a graphic overlay detecting unit 11 and an immediately preceding graphic data memory 21.

In FIG. 1, the host PC generates Page Description Language (hereinafter referred to as PDL) data and transfers the generated PDL data to the printer controller 2. The printer controller 2 performs an image processing operation for the PDL data that are transferred from the host PC 1 and outputs the data via the page memory 23 to the printer engine 4.

More specifically, the PDL data that are input from the host PC 1 to the printer controller 2 are input to the interpreter 10, then the PDL data are interpreted as intermediate data fitted to a rendering process and are stored in the intermediate data memory 20. The operation is performed by the CPU 14. The intermediate data which are converted suitable to the rendering process as described so far include a rendering range designation instruction and a rendering color designation instruction. Each of the rendering data stored in the intermediate data memory 20 undergoes overlay detection to determine whether each of the present data has an image portion overlaid with an immediately preceding data in the graphic overlay processing unit 3 and are processed in the graphic rendering processing unit 12. In one example, when a target figure to be image-processed is a rectangle, the figure is determined as overlaid with rectangle data stored in the immediately preceding graphic data memory 21. Coordinates information data of the portions that are overlaid which are omissible in a data processing are corrected. In the graphic rendering processing unit 12, figure data included in the corrected rectangle data are rendered in the page memory 23 according to the rectangle data that are corrected in the graphic overlay detection unit 11 and also according to information in the intermediate data memory 20. After carrying out a rendering instruction for one page, information contents of the page memory 23 are output to the printer engine 4.

Next, the overlay detection performed in the PC will be explained.

Figure 2:
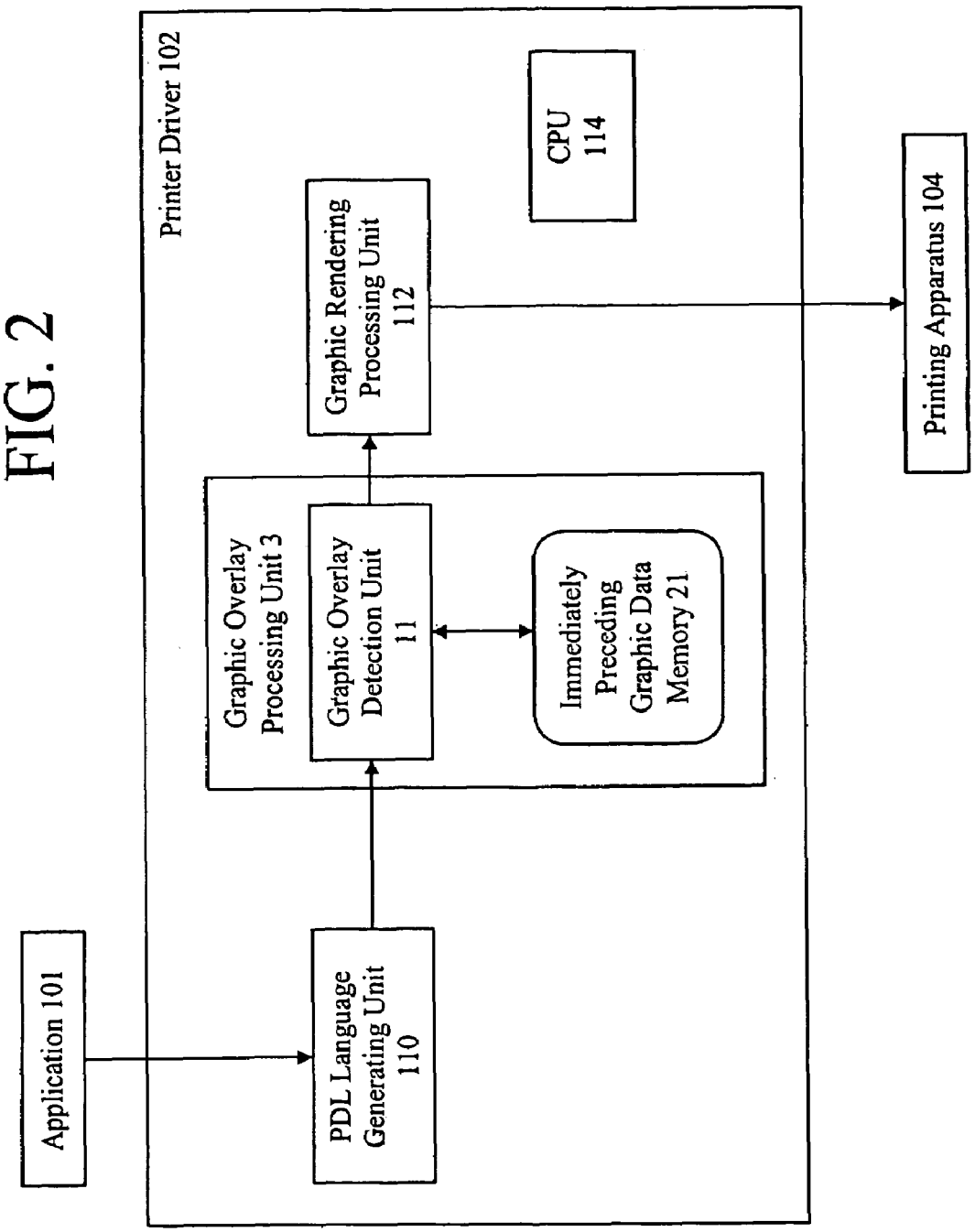
FIG. 2 is a block diagram showing an exemplary structure of a printer driver including the image processing apparatus used when an overlay detection is performed in a host computer according to the preferred embodiment.

Referring now to FIG. 2, a block diagram illustrating an exemplary structure of a printer driver 102 including a graphic overlay processing unit 3 which is an image processing apparatus in the embodiment is shown. As shown in FIG. 2, the printer driver 102 which is connected to an application 101 and a printing apparatus 104 includes the graphic overlay processing unit 3 including the graphic overlay detection unit 11 and the immediately preceding graphic data memory 21 which is substantially equivalent to apparatus of FIG. 1. The printer driver 102 further includes a PDL language generating unit 110, a PDL language output unit 112 and a central processing unit (CPU) 114.

In FIG. 2, the application 101 generates a rendering instruction and outputs the generated instruction to the printer driver 102. In an operating system such as Windows, for example, a rendering instruction is generally specified through a rendering interface called Graphics Device Interface (GDI). Upon an instruction from the application 101, the printer driver 102 generates a PDL language created to be fitted to a printer language included in various printing apparatuses which will print out. The above-described PDL generated is transferred to the printing apparatus 104. The printer driver 102 generates a rendering instruction from the application 101 into the PDL language adaptable to a printer language and outputs to the printing apparatus 104.

The rendering instruction output from the application 101 to the printer driver 102 is input to the PDL language generating unit 110 and is generated as rendering data which are compiled with the PDL language fitted to the rendering instruction. The rendering data generated as shown above are output to the printing apparatus 104 via the PDL language output unit 112 after each of the rendering undergoes an overlay detection to determine whether each of the present data has an image portion overlaid with an immediately preceding data in the graphic overlay processing unit 3. In one example, when a target figure to be processed is a rectangle, the figure is determined as overlaid with rectangle data stored in the immediately preceding graphic data memory 21. Coordinates data of the portions that are overlaid which are omissible in a data processing are corrected. When intermediate data are other than the rectangle rendering, data correction is not performed. The rendering data obtained in the above-described process are transferred from the PDL language output unit 112 to the printing apparatus 104.

Figure 3A:
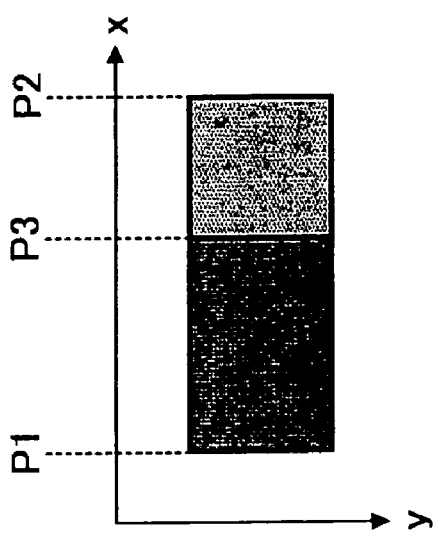
FIGS. 3A through 3C collectively show an exemplary illustration of an overlay detection of a rectangle performed in a graphic overlay determination unit of FIG. 1.
Figure 3B:
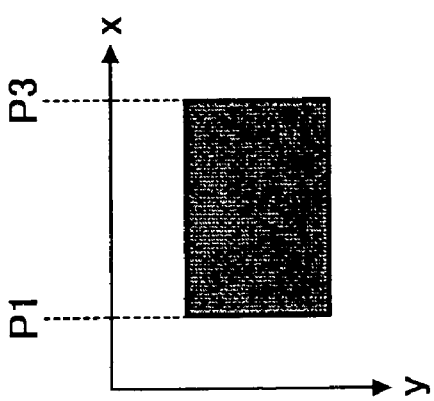
Figure 3C:
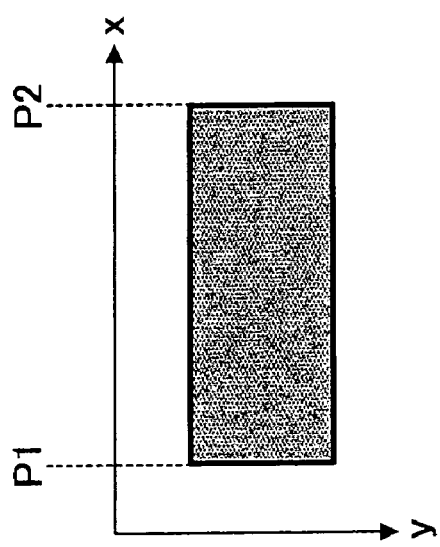

Referring to FIGS. 3A, 3B and 3C, an exemplary procedure of the overlay detection of a rectangle performed in a graphic overlay detection unit 11 is explained.

A rectangle shown in FIG. 3A is an example of a rectangle which has been rendered first. The first rendered rectangle extends from a coordinate P1 to a coordinate P2 in the direction x. A rectangle shown in FIG. 3B is an example of a second rectangle which has been rendered. FIG. 3C shows an example of a state in which the second rectangle overlays on the first rectangle. The second rendered rectangle extends from the coordinate P1 to the coordinate P3 in the direction x. It is assumed that the first and the second rectangles are adjacently aligned in accordance with a rendering instruction order. It is also assumed that the ranges of the first and the second rectangles in the direction y are both identical. Sides of the two rectangles of FIGS. 3A and 3B are on a line parallel to the axis y with the distance P1, for example, from axis y. The two rectangles are positioned where a rectangle includes or, in other words, overlay on another rectangle. The relationship of the position of the two rectangles is defined to satisfy the following: P1 is equal to or smaller than P2 and P1 is equal to or smaller than P3. In FIG. 3C, P3 is equal to or smaller than P2, for example. Each of the two rectangles has an arbitrary image density.

In FIG. 3C, the second rectangle shown in FIG. 3B overlays on and overwrites a left part of first rectangle of FIG. 3A and the overlaid part is not rendered because the second rectangle of FIG. 3B overwrites the left part of the first rectangle of FIG. 3A. Rendering data on the overlaid part of the two rectangles of FIGS. 3A and 3B is not needed. To obtain the rectangle of FIG. 3C, a part of a rectangle indicated by the coordinates P3 and P2 in the direction x of FIG. 3C and the whole part of the rectangle of FIG. 3B are added.

In order to omit unneeded part of the rectangle, that is, the overlaid part, it is needed to change the coordinates. In one example, the coordinates P1 and P2 in the direction x of the rectangle of FIG. 3A are needed to be changed to the coordinates P3 and P2 in the direction x.

Generally, it is a complex and a difficult work and requires a great amount of processing time to detect an overlay of a polygon. However, it is simple and requires only a few calculations to detect rectangles such as the rectangles as shown in FIGS. 3A, 3B and 3C. When an overlay detection is attempted upon arbitrary rectangle rendering instructions which are not arranged adjacently according to the order of a rendering instruction, for example, a rendering instruction that all the rectangles in a page is performed, the time of detection is proportional to the square of the number of rectangles in the page, thereby requiring more time for detecting an overlay and the processing inevitably becomes slower. Because, in this case, coordinates of a rectangle of a preceding rectangle such as the first rectangle, for example, are corrected, every rendering instruction needs to be stored temporarily, thereby producing ineffectiveness. When it is possible to detect an overlay for rectangles in one page, redundant access to other redundant page memories is minimized and the method described above is ideal. However, the method described above may not be practical because an image processing apparatus is provided with a limited amount of resources such as a memory, for example.

With the use of the embodiment described so far, because an object to be detected is limited to figures which are aligned adjacent such as the first and the second rectangles in this embodiment, for example, an image outputting apparatus with small capacity of resources is capable of effectively rendering the figures with a limited capacity of resources. However, a rendering method according to the present objects is to omit a rendering process of a portion of figures to be overlaid by another figure by way of overwriting of the latter figure on the former figure. As a result, only a target figure is rendered. However, in a rendering method using an OR operation, a figure that is overlaid by another figure is rendered.

Figure 4:
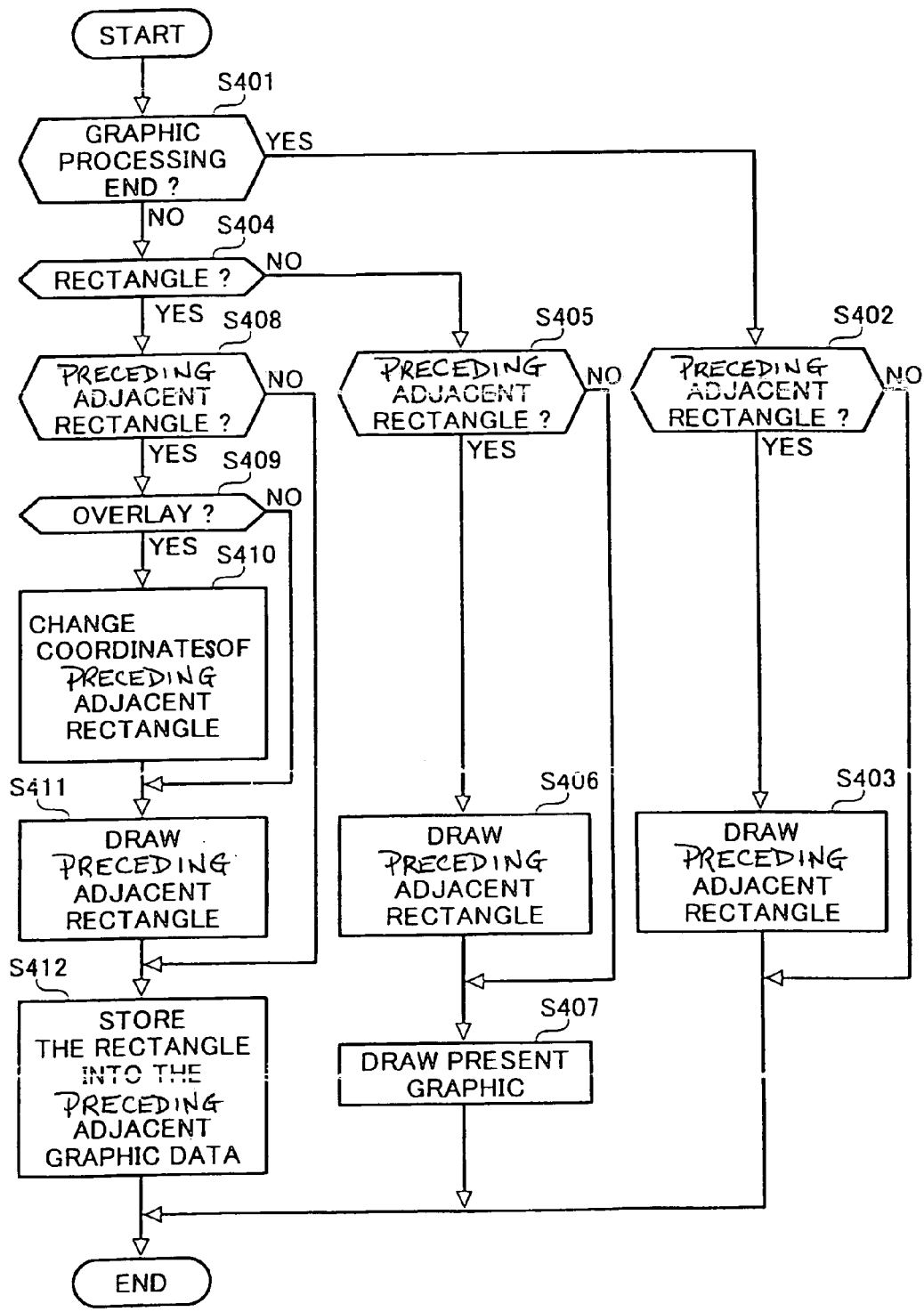
FIG. 4 is a flowchart showing an exemplary procedure of an overlay detection of rectangle.

Referring to FIG. 4, an exemplary procedure of an overlay detection process performed by the printer controller 2 of FIG. 1 will be explained. This procedure can also be applied to the printer driver 104 of FIG. 2.

In Steps from S401 through S403 the CPU 14 determines whether the graphic overlay detection unit 11 has finished the overlay detection process (e.g. a figure of FIG. 3B). When the CPU 14 determines that the overlay detection is finished, the CPU 14 determines whether an immediately preceding figure (e.g. a figure of FIG. 3 A) stored in the immediately preceding graphic data memory 21 is a rectangle. When the CPU 14 determines that the immediately preceding figure is a rectangle, the immediately preceding figure is rendered and the process ends. When the immediately preceding figure is not a rectangle, the CPU 14 finishes the process without rendering the immediately preceding figure.

Referring to Steps S404 through S406, when the CPU 14 determines that the overlay detection process is not finished in Step S401, the CPU 14 determines whether a target figure (e.g. a figure of FIG. 3B) to be processed is not a rectangle in Step S404. When the target figure is not a rectangle, the CPU 14 determines in Step S405 whether the figure stored in the immediately preceding graphic data memory 21 is a rectangle. If the CPU 14 determines that the figure stored in the immediately preceding graphic data memory 21 is a rectangle, the CPU 14 instructs to render the rectangle stored in the immediately preceding graphic data.

Then, in Step S407, the CPU 14 instructs to render the target figure which is determined as not a rectangle in Step S404. Also, in Step S407, when the result of Step S405 is NO, the CPU 14 instructs to render the target figure in Step S404.

When the result of Step S404 is YES, that is, when the CPU 14 determines that the target figure to be processed is a rectangle, the CPU determines in Step S408 whether the figure stored in the immediately preceding graphic data memory 21 is a rectangle. When the CPU 14 determines that the figure stored in the immediately preceding graphic data memory 21 is a rectangle, the CPU 14 examines the relationship of position between the target figure to be processed and the immediately preceding figure stored in the immediately preceding graphic data memory 21. In Step S409, the CPU 14 determines whether the target figure to be processed and the figure stored in the immediately preceding graphic data memory 21 have an overlay portion. When the CPU 14 determines that the target figure to be processed and the figure stored in the immediately preceding graphic data memory 21 have an overlaid portion in Step S409, the CPU 14 divides the immediately preceding graphic data or creates a rectangle whose coordinates data are changed to reduce the overlaid portion in Step S410. Then, in Step S411, the CPU 14 renders the divided rectangle of Step S410. When the CPU 14 determines that the target figure to be processed and the figure stored in the immediately preceding graphic data memory 21 have no overlaid portion in Step S409, the CPU instructs to render the immediately preceding rectangle in Step S411. In Step S412, when the result is NO after referring to Step S408, the CPU 14 instructs to store the target figure presently being processed into the immediately preceding graphic data memory 21 for future use.

The above-described steps are repeatedly performed for figures to be input. As is shown in FIG. 3A, within the range of coordinates from P1 to P3 in the direction x, there is no need to have figure data written in a page memory (not shown), and thereby high-speed graphic data processing can be achieved. The graphic data which are obtained in a manner described above produces an identical result as the result explained in FIG. 3C.

Next, referring now to FIGS. 5A, 5B and 5C, another examples related to the overlay detection for a rectangle performed in the graphic overlay detection unit 11 will be explained.

Figure 5C:
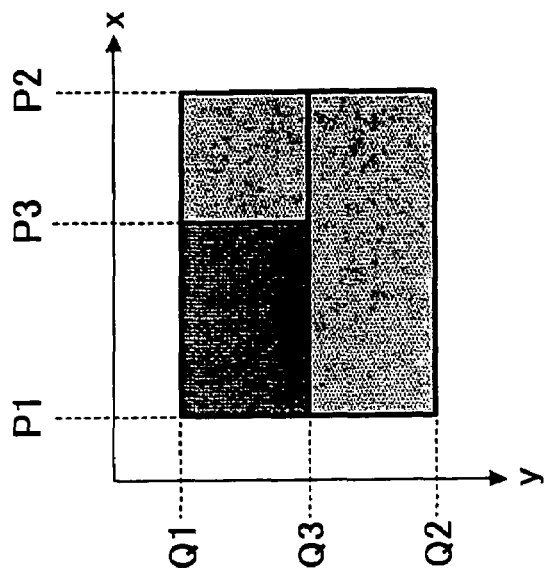
FIGS. 5A through 5C collectively show another exemplary illustration of an overlay detection of a rectangle performed in a graphic overlay determination unit of FIG. 1.
Figure 5B:
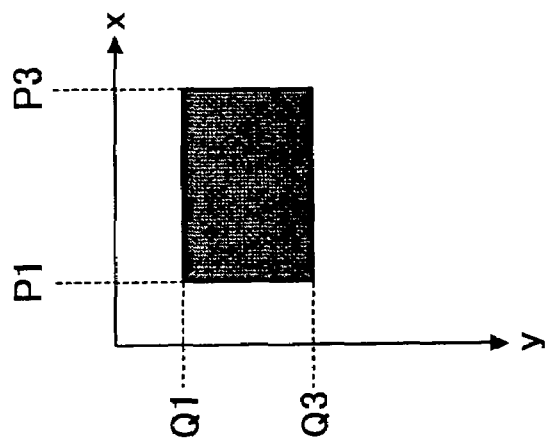
Figure 5A:
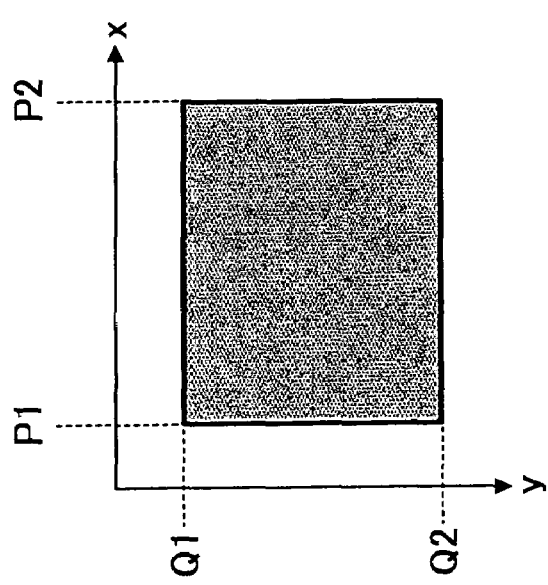

More specifically, a rectangle of FIG. 5A is an example of a rectangle which will be rendered first and has four corner points which are represented by the coordinates (P1, Q1), (P1, Q2), (P2, Q1) and (P2, Q2). A rectangle shown in FIG. 5B is an example of a second rectangle which will be rendered and has four corner points which are represented by the coordinates (P1, Q1), (P1, Q3), (P3, Q1) and (P3, Q2). The relationship of positions of the first and second rectangles of FIGS. 5A and 5B is such that the rectangle of FIG. 5A includes the figure of FIG. 5B, in other words, the second figure of FIG. 5B overlays the first figure of FIG. 5A. The relationship of the two rectangles is defined to satisfy the following inequalities: P1 is equal to or smaller than P2, P1 is equal to or smaller than P3, Q1 is equal to or smaller than Q2 and Q1 is equal to or smaller than Q3. In the above-described inequalities, the relationship of magnitudes of the coordinates P2 and P3 is not limited to the above. That is, P3 may be greater than P2. Each of the first and the second rectangles has an arbitrary image density.

The figure of FIG. 5C is an overlaid rectangle graphic created from the overlay of the second rectangle of FIG. 5B on the first rectangle of FIG. 5A. In this example, the rectangle of FIG. 5B overlays the rectangle of FIG. 5A. A left upper portion of the first figure, which is a portion to be overlaid by the second figure is not rendered because the left upper portion is overwritten by the rectangle of FIG. 5B. It is not necessary to perform rendering process for the left upper portion for the first rectangle of FIG. 5A. Therefore, in order to obtain a graphic figure shown in FIG. 5C, a portion where the rectangle of FIG. 5B does not overlay on the first rectangle of FIG. 5A and the whole portion of the second rectangle of FIG. 5B are rendered. As shown in FIG. 5C, the portion where the second rectangle of FIG. 5B does not overlay on the first rectangle of FIG. 5A includes two rectangles. One of the two rectangles is positioned at the coordinates (P1, Q3), (P1, Q2), (P2, Q3) and (P2, Q2). The other rectangle is positioned at the coordinate (P3, Q1), (P3, Q3), (P2, Q1) and (P2, Q3). The above-described rectangles are divided and processed separately. Therefore, the portion where the rectangle of FIG. 5B does not overlay on the rectangle of FIG. 5A can be rapidly processed when the non-overlaid portion is divided and processed than if the non-overlaid portion is processed as a one figure.

The examples explaining the overlay of rectangles as shown in FIGS. 5A, 5B and 5C, are a simplified example in which the coordinates of the two rectangles of FIGS. 5A and 5B coincide with the uppermost and left coordinates P1 and Q1. Hence, there are a variety of ways associated with an overlay with the use of two rectangles. Even if figures are overlaid in other ways, the overlaid rectangles can be calculated by analogy of the embodiment as described above.

As described above, an explanation is made as to the overlay detection when a target figure to be processed is a rectangle. The following is an explanation of an overlay detection when a target figure to be processed is a figure including data run aggregates.

Hardware structure substantially identical with the structure of the image processing apparatus of FIG. 1 is applied to explaining the overlay of figures including data run aggregates performed in a printing apparatus.

More specifically, rendering data which are input to the printer controller 2 (FIG. 1) are input to the interpreter 10 (FIG. 1) and interpreted as an intermediate data fitted to a rendering process and are stored in the intermediate data memory 20 (FIG. 1). The operation is performed by the CPU 14 (FIG. 1). The intermediate data which are converted to be fitted to the rendering process as described above include the rendering range designation instruction and the rendering color designation instruction.

When the intermediate data include figures including data run aggregates, for example, the figures including data run aggregates are determined in the graphic overlay detection unit 11 (FIG. 1) as overlaid with FIGS. including data run aggregates stored in the immediately preceding graphic data memory 21 (FIG. 1).

Data containing information on coordinates of an overlaid portion that are omissible in a data processing are corrected. When the intermediate data is other than figures including data run aggregates, data correction is not performed. In the graphic rendering processing unit 12 (FIG. 1), figures of data run aggregates included in the corrected figure data of aggregates of runs are rendered in the page memory 23 according to the figure data of data run aggregates that are corrected in the graphic overlay detection unit 11 (FIG. 1) and information stored in the intermediate data memory 20 (FIG. 1). After processing a rendering instruction for one page, the information contents of the page memory 23 are output to the printer engine 4.

Next, referring to FIGS. 6A through 6C, an example of the overlay detection performed by the graphic overlay detection unit 11 for figures of data run aggregates including runs of data will be explained.

Each of the data run aggregates represents a data block which extends from a start point sx to an end point ex in the horizontal direction X along the axis x with an arbitrary point in the coordinate y. The data run aggregates as described above are used to specify a range of rendering instructions as rendering instructions. The data run aggregates of FIG. 6A are a first figure which are firstly rendered and the data run aggregates of FIG. 6B are a second figure which are secondly rendered. As is same with the case of the above-described rectangle process, it is assumed that the data run aggregates of FIGS. 6A and 68B are arranged adjacently. The density of the color images of FIGS. 6A and 6B are arbitrary, respectively. The figure of FIG. 6C is created from a process of an overlay of the second figure of FIG. 6B on the first figure of 6A, that is, the first figure of 6A is overwritten by the figure of FIG. 6B. A left part of the figure of FIG. 6A is not rendered because the data run aggregates of FIG. 6B are overwritten on a part of the data run aggregates of FIG. 6A in which the first figure of 6A and the second figure of 6B are overlaid. Therefore, the process of the overlaid part is unnecessary because the data run aggregates of FIG. 6B are overwritten on a part of the data run aggregates of FIG. 6A. In order to obtain the figure of FIG. 6C, a portion of FIG. 6A that is not overlaid with the figure of FIG. 6B and the whole portion of data run aggregates of FIG. 6B are added to each other. A process of the above-described addition of the two figures for rendering is the best way to process graphic data without processing overlaid graphic portion by omitting a redundant process, thereby reducing the amount of rendering process.

In order to obtain a run of the data run aggregates of FIG. 6A which is not overlaid by the data run aggregates of FIG. 6B, each of the runs of aggregates of data included in FIG. 6B is examined and it is determined whether any one run of the data run aggregates of FIG. 6B is overlaid on any run of the data run aggregates included in the figure of FIG. 6A. A process is performed to determine whether a run which is determined as overlaid is overlaid with respect to a whole of the run. When one run of the data run aggregates is determined as overlaid as a whole, the run is deleted. In FIG. 6B, for example, a run with the condition that y equals to 1, sx equals to 4 and ex equals to 5 (hereinafter referred to as RB (1, 4, 5)) does not fall into the category of an overlaid run. The character RB refers to the data run aggregates in FIG. 6B. In the case of FIG. 6A, the data run aggregates are referred as RA. Therefore, the run (1, 1, 2) of the data run aggregates RA of FIG. 6A described above remains as not overwritten. The run (2, 3, 5) of the data run aggregates RB of FIG. 6B has an overlaid portion with the run (2, 1, 3) of data run aggregates RA (2, 1, 3) on the portion (2, 3). The overlaid portion (2, 3) is deleted and the run (2, 1, 3) of data run aggregates RA of FIG. 6A is changed into Ra (2, 1, 2). Because the run (4, 1, 5) of data run aggregates RB of FIG. 6B is overlaid on the run (4, 1, 5) of data run aggregates RA of FIG. 6A, the run (4, 1, 5) of data run aggregates RA of FIG. 6A is deleted in the data run aggregates RA.

Generally, it is a complex and difficult work and requires a great amount of processing time to detect an overlay of a polygon. However, it may be simple and require only a few calculations to detect the overlay between runs of data run aggregates as shown in FIGS. 6A, 6B and 6C. However, the same applies to the case of an overlay detection using a rectangle in a point where a rendering mechanism of omitting a rendering process for figures in which overlaid figures such as rectangles or runs, for example, may be deleted by way of overwriting, causing target graphic data to be rendered to remain.

In some of the example explained in FIGS. 6A, 6B, 6C and 6D of the first (FIG. 6A) and the second (FIG. 6B) data run aggregates are in the same position in the axis y. However, in many cases, data run aggregates are displaced in the axis y. When the two runs of data are displaced and when an overlay between the two runs of aggregates of data is attempted to be detected by every run, a number of comparisons equal to a number of multiplications of the number of the first runs of aggregates by the number of the second runs of the aggregates is needed. This causes the above-described operation to be ineffective.

Next, referring to FIGS. 7A, 7B, 7C and 7D, an exemplary procedure to overcome the above-mentioned defects will be explained in which an overlay detection described so far is performed to detect whether a target rectangle have an overlaid potion of FIG. 3 and when an overlay is detected, an overlay detection is performed between the runs of aggregates of data of FIG. 6 by converting a specific runs of aggregates of data into adjacent rectangles.

Figure 7A:
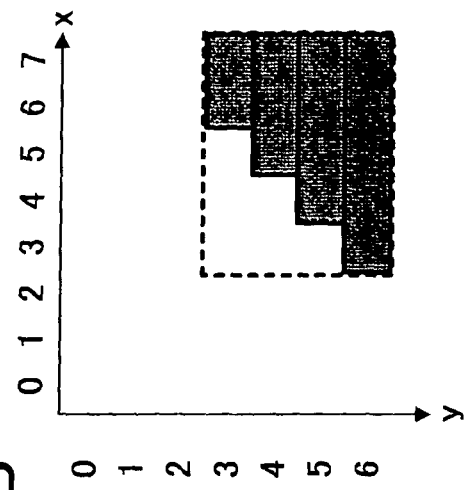
Figure 7B:
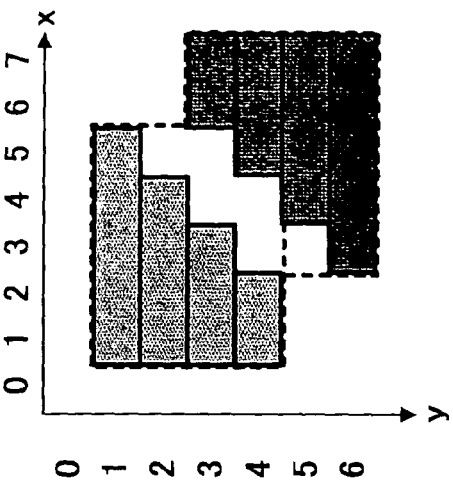
Figure 7C:
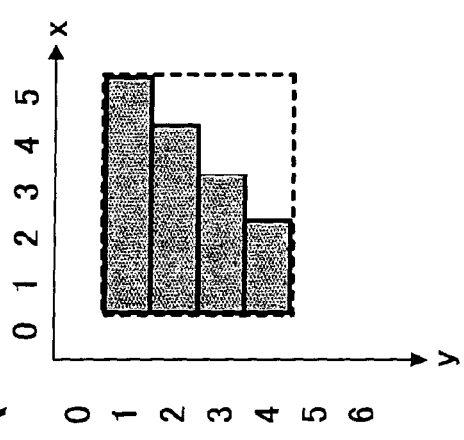
Figure 7D:
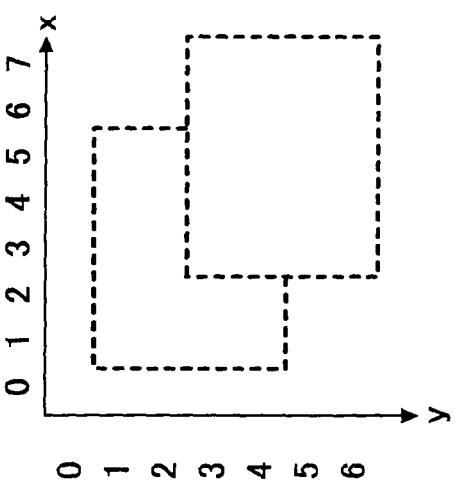

Data run aggregates of FIG. 7A is a figure of data run aggregates which is a first figure that has been rendered first. Data run aggregates of FIG. 7B are a figure of data run aggregates which is a second figure that has been rendered second. Based on these first and second figures of FIGS. 7A and 7B, respectively, an overlay detection is performed. Dotted rectangle lines which circumscribe the first and second figures are circumscribed rectangles of FIGS. 7A and 7B, respectively. Two of the dotted line rectangles show the relationship of position for the two rectangles which are placed adjacent as shown in FIG. 7C. It is determined that the dotted two rectangles are overlaid. If these two rectangles are positioned where the two rectangles are not superimposed, it is apparent that runs of aggregates of data included in the rectangles are not superimposed. As shown in FIG. 7C, when the two adjacent rectangles are overlaid, an overlay detection is performed to determine overlay between the runs of data in a portion where the two adjacent rectangles of FIGS. 7A and 7B are overlaid. In figures shown in FIGS. 7A and 7B, for example, it is determined whether a run of aggregates is overlaid and as a result no runs of data is determined to be overlaid. When there is an overlaid portion between the two figures of FIGS. 7A and 7B, a part that is overlaid firstly, that is, in figure FIG. 7A, for example, is deleted. If there is an overlaid portion in FIG. 7C, the portion of figure in FIG. 7A which is firstly rendered is deleted.

As described above in FIGS. 7A, 7B, 7C and 7D, in the preferred embodiment, any portion of adjacent rectangles is overlaid, an overlay detection for the above-described portions that are overlaid is proposed to be performed. According to the preferred embodiment, an overlaid portion is provided with a threshold according to an area ratio in which adjacent rectangles are overlaid. When an area ratio is more than a predetermined threshold, it is determined that two or more adjacent rectangles are overlaid before an overlay detection is performed between runs of aggregates of data that are overlaid. In one example, when adjacent rectangles included in runs of aggregates which have been rendered first are overlaid on another adjacent rectangle included in runs of data of aggregates which have been rendered second in an area ratio of 90%, it is determined that the adjacent two rectangles are overlaid. The threshold of the area ratio rate on overlay of adjacent two or more rectangles is one of the examples in the preferred embodiment and the area ratio may be assigned arbitrarily.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent applications, No. JPAP2002-214014 filed on Jul. 23, 2002, in the Japanese Patent Office, the entire contents of which are incorporated by reference herein.

What is claimed is:

1. An image processing apparatus comprising:
an overlay detector configured to perform an overlay detection to detect an overlay of first and second original images which are rendered based on first and second rendering data by first and second graphic rendering instructions, respectively; and
a memory storing the first rendering data contained in the first graphic rendering instruction,
wherein said first and second graphic rendering instructions are sequentially processed, and said first graphic rendering instruction is input immediately preceding said second graphic rendering instruction,
wherein the overlay detector specifies a portion of the first original image to be overlaid by the second original image upon detecting an overlay of the first and second original images, modifies said first rendering data to omit the specified portion, draws a third output image based on the modified first rendering data in which the specified portion of the first original image is deleted, and stores the modified first rendering data and the second rendering data into the memory, and
wherein if the first original image and the second original image have no overlaid portion, said image processing apparatus renders the first rendering data, and upon rendering said first rendering data, the overlay detector stores the second rendering data presently being processed into the memory.

2. The image processing apparatus as defined in claim 1, wherein said graphic rendering instructions are configured to be a page description language and each of said graphic rendering instructions are configured to include a fundamental graphic description instruction which handles characters, graphics and images and a rendering attribute instruction handling colors, clipping area designations and rendering arithmetic methods.

3. The image processing apparatus as defined in claim 1, wherein said graphic rendering instructions are configured to be converted into at least one of intermediate data represented by coordinate information and a PDL language.

4. The image processing apparatus as defined in claim 1, wherein the second output image is configured to be overwritten on the third output image.

5. The image processing apparatus as claimed in claim 4, wherein the first and second output image are configured to be drawn with a rendering process based on at least one of a mono chrome, an RGB video color rendering, and a CMYK paint color rendering.

6. An image processing apparatus comprising:
overlay detecting means for performing an overlay detection to detect an overlay of first and second original images which are rendered based on first and second rendering data by first and second graphic rendering instructions, respectively; and
a memory storing the first rendering data contained in the first graphic rendering instruction,
wherein said first and second graphic rendering instructions are sequentially processed, and said first graphic rendering instruction is input immediately preceding said second graphic rendering instruction, and
wherein the overlay detecting means detects a portion of the first original image to be overlaid by the second original image upon detecting an overlay of the first and second original images, modifies said first rendering data to omit the specified portion, draws a third output image based on the modified first rendering data in which the specified portion of the first original image is deleted, and stores the modified first rendering data and the second rendering data into the memory.

7. The image processing apparatus as defined in claim 6, wherein said graphic rendering instructions are a page description language and each of said graphic rendering instructions includes a fundamental graphic description instruction which handles characters, graphics and images and a rendering attribute instruction handling colors, clipping area designations and rendering arithmetic methods.

8. The image processing apparatus as defined in claim 6, wherein said graphic rendering instructions are converted into at least one of intermediate data represented by coordinate information and a PDL language.

9. The image processing apparatus as defined in claim 6, wherein the second output image is overwritten in the third output image.

10. The image processing apparatus as claimed in claim 6, wherein the first and second output image are drawn with a rendering process based on at least one of a mono chrome, an RGB video color rendering, and a CMYK paint color rendering.

11. An image processing method comprising the steps of:
performing an overlay detection to detect an overlay of first and second images which are rendered based on first and second rendering data by first and second graphic rendering instructions, respectively; and
storing the first rendering data contained in the first graphic rendering instruction,
wherein said first and second graphic rendering instructions are sequentially processed, and said first graphic rendering instruction is input immediately preceding said second graphic rendering instruction, and
wherein the overlay detecting methods specifies a portion of the first original image to be overlaid by the second original image upon detecting an overlay of the first and second original images, modifies said first rendering data to omit the specified portion, draws a third output image based on the modified first rendering data in which the specified portion of the first original image is deleted, and stores the modified first rendering data and the second rendering data into the memory.

12. The image processing method as defined in claim 11, wherein said graphic rendering instructions are a page description language and each of said graphic rendering instructions includes a fundamental graphic description instruction which handles characters, graphics and images and a rendering attribute instruction handling colors, clipping area designations and rendering arithmetic methods.

13. The image processing method as defined in claim 11, wherein said graphic rendering instructions are converted into at least one of intermediate data represented by coordinate information and a PDL language.

14. The image processing method as defined in claim 11, wherein the second output image is overwritten in the third output image.

15. The image processing method as claimed in claim 11, wherein the first and second output image are drawn with a rendering process based on at least one of a mono chrome, an RGB video color rendering, and a CMYK paint color rendering.

16. A printing apparatus comprising:
overlay detecting means for performing an overlay detection to detect an overlay of first and second original images which are rendered based on first and second rendering data by first and second graphic rendering instructions, respectively; and
a memory storing the first rendering data contained in the first graphic rendering instruction,
wherein said first and second graphic rendering instructions are sequentially processed, and said first graphic rendering instruction is input immediately preceding said second graphic rendering instruction, and
wherein the overlay detecting means specifies a portion of the first original image to be overlaid by the second original image upon detecting an overlay of the first and second original images, modifies said first rendering data to omit the specified portion, draws a third output image based on the modified first rendering data in which the specified portion of the first original image is deleted, and stores the modified first rendering data and the second rendering data into the memory.

17. The printing apparatus as defined in claim 16, wherein said graphic rendering instructions are a page description language and each of said graphic rendering instructions includes a fundamental graphic description instruction which handles characters, graphics and images and a rendering attribute instruction handling colors, clipping area designations and rendering arithmetic methods.

18. The printing apparatus as defined in claim 16, wherein said graphic rendering instructions are converted into at least one of intermediate data represented by coordinate information and a PDL language.

19. The printing apparatus as defined in claim 16, wherein the second output image is overwritten in the third output image.

20. The printing apparatus as claimed in claim 16, wherein the first and second output image are drawn with a rendering process based on at least one of a mono chrome, an RGB video color rendering, and a CMYK paint color rendering.

21. A host PC which sequentially processes graphic rendering instructions for image data, said host PC comprising:
overlay detecting means for performing an overlay detection to detect an overlay of first and second original images which are rendered based on first and second rendering data by the first and second graphic rendering instructions, respectively; and
a memory storing the first rendering data contained in the first graphic rendering instruction,
wherein said first and second graphic tendering instructions are sequentially processed, and said first graphic rendering instruction is input immediately preceding said second graphic rendering instruction, and wherein the overlay detecting means specifies a portion of the first original image to be overlaid by the second original image upon detecting an overlay of the first and second original images, modifies said first rendering data to omit the specified portion, draws a third output image based on the modified first rendering data in which the specified portion of the first original image is deleted, and stores the modified first rendering data and the second rendering data into the memory.

22. The host PC as defined in claim 21, wherein said graphic rendering instructions are a page description language and each of said graphic rendering instructions includes a fundamental graphic description instruction which handles characters, graphics and images and a rendering attribute instruction handling colors, clipping area designations and rendering arithmetic methods.

23. The host PC as defined in claim 21, wherein said graphic rendering instructions are converted into at least one of intermediate data represented by coordinate information and a PDL language.

24. The host PC as defined in claim 21, wherein the second output image is overwritten in the third output image.

25. The host PC as claimed in claim 21, wherein the first and second output image are drawn with a rendering process based on at least one of a mono chrome, an RGB video color rendering, and a CMYK paint color rendering.

26. An image forming apparatus, comprising:
overlay detecting means for performing an overlay detection to detect an overlay of first and second original images which are rendered based on first and second rendering data by first and second graphic rendering instructions, respectively; and
a memory storing the first rendering data contained in the first graphic rendering instruction,
wherein said first and second graphic rendering instructions are sequentially processed, and said first graphic rendering instruction is input immediately preceding said second graphic rendering instruction, and
wherein the overlay detecting means specifies a portion of the first original image to be overlaid by the second original image upon detecting an overlay of the first and second original images, modifies said first rendering data to omit the specified portion, draws a third output image based on the modified first rendering data in which the specified portion of the first original image is deleted, and stores the modified first rendering data and the second rendering data into the memory; and
wherein if the first original image and the second original image have no overlaid portion, said image processing apparatus renders the first rendering data, and upon rendering said first rendering data, the overlay detector stores the second rendering data presently being processed into the memory.

27. The image forming apparatus as defined in claim 26, wherein said graphic rendering instructions are a page description language and each of said graphic rendering instructions includes a fundamental graphic description instruction which handles characters, graphics and images and a rendering attribute instruction handling colors, clipping area designations and rendering arithmetic methods.

28. The image forming apparatus as defined in claim 26, wherein said graphic rendering instructions are converted into at least one of intermediate data represented by coordinate information and a PDL language.

29. The image forming apparatus as defined in claim 26, wherein the second output image is overwritten in the third output image.

30. The image forming apparatus as claimed in claim 26, wherein the first and second output image drawn with a rendering process based on at least one of a mono chrome, an RGB video color rendering, and a CMYK paint color rendering.

31. The image forming apparatus of claim 1, wherein said portion of the first original image overlaid by the second original image is not rendered.

\* \* \* \* \*